(12) United States Patent
Malczyk et al.

(10) Patent No.: US 6,488,309 B1
(45) Date of Patent: Dec. 3, 2002

(54) AIRBAG MODULE WITH A MULTISTAGE GAS GENERATOR

(75) Inventors: Axel Malczyk, Berlin (DE); Falk Ose, Berlin (DE); Takashi Sakaguchi, Mombria (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 09/787,282

(22) PCT Filed: Sep. 10, 1999

(86) PCT No.: PCT/DE99/02957
§ 371 (c)(1), (2), (4) Date: Jun. 6, 2001

(87) PCT Pub. No.: WO00/15468
PCT Pub. Date: Mar. 23, 2000

(30) Foreign Application Priority Data

Sep. 15, 1998 (DE) .......................................... 198 43 214

(51) Int. Cl.⁷ ............................................. B60R 21/20
(52) U.S. Cl. .................................. 280/728.3; 280/731
(58) Field of Search ............................. 280/728.3, 731, 280/732, 736, 728.2, 743.1, 728.1

(56) References Cited

U.S. PATENT DOCUMENTS

| | | | | |
|---|---|---|---|---|
| 5,013,065 A | * | 5/1991 | Kreuzer | 280/728.3 |
| 5,060,971 A | * | 10/1991 | Nanbu et al. | 280/728.3 |
| 5,084,122 A | * | 1/1992 | Fukushima et al. | 280/731 |
| 5,342,086 A | * | 8/1994 | Harris et al. | 280/728.3 |
| 5,346,254 A | * | 9/1994 | Esterberg | 280/736 |
| 5,364,126 A | * | 11/1994 | Kuretake et al. | 280/736 |
| 5,431,435 A | | 7/1995 | Wilson | 280/728.3 |
| 5,460,402 A | | 10/1995 | Rhodes, Jr. | 280/728.3 |
| 5,582,424 A | * | 12/1996 | Okuyama et al. | 280/728.3 |
| 6,224,100 B1 | * | 5/2001 | Kamano et al. | 280/731 |

FOREIGN PATENT DOCUMENTS

| | | |
|---|---|---|
| DE | 23 47 255 | 4/1974 |
| DE | 31 16 538 | 11/1982 |
| DE | 38 11 373 | 10/1988 |
| DE | 42 20 499 | 1/1994 |
| DE | 296 16 682 | 2/1997 |
| DE | 197 01 106 | 7/1998 |
| DE | 298 05 217 | 9/1998 |
| DE | 298 04 239 | 10/1998 |
| DE | 197 56 977 | 7/1999 |
| EP | 0 705 737 | 4/1996 |
| JP | 07069149 | 3/1995 |
| WO | WO 98/10961 | 3/1998 |

OTHER PUBLICATIONS

XP000596164 ISSN: 0374–4355; "Tethered Deployment Door"; *Research Disclosure, GB, Industrial Opportunities Ltd. Havant*; pp 349–351.

* cited by examiner

*Primary Examiner*—Peter C. English
(74) *Attorney, Agent, or Firm*—Foley & Lardner

(57) ABSTRACT

An airbag module has a housing, a multiple stage gas generator, a gas bag and a gas bag cover. In an inoperative state the gas bag lies in a folded condition next to the gas generator. Only one gas bag layer extends over the generator so that after ignition of the gas generator, the gas bag is drawn successively out from a housing by the gases discharged from the generator. The gas bag cover is formed so that after opening the gas bag cover increasingly greater forces are required to unfold the gas bag from a predetermined time point onwards and so that an outer part of the gas bag only unfolds in the event of the greater forces.

13 Claims, 7 Drawing Sheets

AIRBAG MODULE WITH A MULTISTAGE GAS GENERATOR

BACKGROUND OF THE INVENTION

1. Field of the Invention

The invention relates to an airbag module with a multistage gas generator.

2. Description of the Relevant Art

When using a multi-stage gas generator in an airbag module the stages are ignited individually or successively in dependence on certain factors, such as e.g. severity of crash, seat position and weight of the occupant. After the ignition of a first stage a gas bag, as used for single-stage gas generators in various different designs, would become fully unfolded whereby the gas bag is loaded with a low internal pressure owing to the small amount of gas produced in this stage by the gas generator. In the event of the occupant striking against this gas bag the danger arises that he is not adequately restrained but becomes injured against parts of the vehicle lying behind the unfolded gas bag.

In order to avoid this disadvantage it is known to unfold the gas bag to different sizes in dependence on the ignited state of the gas generator so that the internal pressure of the gas bag is already large enough after ignition of the first ignition stage. Thus, the gas bag after ignition of the first stage is unfolded only to a slight extent but nevertheless up to such a size that it can protect an out-of-position occupant in the event of impact.

Various different solutions are known in order to achieve the different degree of unfolding. Thus a gas bag is known from DE 298 04 239 U1 for a vehicle passenger restraint system where folded areas of the gas bag wall are stitched by rip seams. These rip seams rip open in the event of different internal pressures inside the gas bag so that the volume of the gas bag increases step by step as the internal pressure rises.

Furthermore from DE 298 05 217 U1 a vehicle passenger restraint system is known where at least one arrester strap is provided inside the gas bag to influence the configuration of the gas bag in the unfolded state. For this a winding device is provided on which the arrester strap is housed at least in part in the inoperative state. The winding device has a brake mechanism which in a path- or time-controlled manner after a certain deployment of the gas bag can produce a controlled braking of the arrester strap and thus of the wall of the gas bag up until the stationary state.

The drawback with these known measures is that the gas bag is more complicated and thus more expensive than conventional gas bags.

From U.S. Pat. No. 5,460,402 an airbag module is known having a single-stage gas generator in which a gas bag cover is fixed at the side on the edge of the housing by several adhesive spots. As the gas bag unfolds first one side adhesive area of the gas bag cover is separated from the associated adhesive surface so that the gas bag cover opens up on one side. As the gas bag unfolds further the other adhesive surfaces of the gas bag cover also become separated. Through this design the gas bag cover experiences a predetermined opening characteristic which is particularly suitable for determining the specific direction of the gas bag deployment and for reducing the speed with which the gas bag unfolds. A multi-stage gas generator is not described.

SUMMARY OF THE INVENTION

The object of the present invention is to obtain at reduced cost a variable unfolding of the gas bag in dependence on the relevant ignited stage of the gas generator.

This is achieved, according to the invention, through an airbag module wherein the gas bag in the inoperative state lies in a folded layer next to the gas bag or a diffuser of the gas bag and only one gas bag layer extends over same so that after ignition of the gas generator the gas bag is drawn only successively out from the housing of the airbag module through the gases discharged from the generator. On the other hand the gas bag cover and/or a part engaging on the folded gas bag is designed so that after the gas bag cover opens from a predetermined time point onwards increasingly greater forces are necessary for the deployment of the gas bag and the outer parts of the gas bag only become unfolded in the event of higher forces.

It was found that through the solution according to the invention it is possible to achieve the same advantageous effect of the variable unfolding as when arrester straps and rip seams are used. Thus no changes have to be made to the gas bag compared to a gas bag for a single-stage gas generator. Folding the gas bag so that after ignition of the gas generator the gas bag is drawn successively out from the housing through the gases discharged, instead of being pressed completely out from the housing, is known per se and requires no additional expense. The required change to the gas bag cover or a part additionally engaging on the gas bag incurs only a slight additional expense.

The gas bag cover is designed according to the invention so that it can be ripped open with increasingly more difficulty from a predetermined point. This predetermined point can be directly adjoining the rip seam of the gas bag cover but can also be provided at a certain distance therefrom. When the gas bag unfolds after ignition of the first stage of the gas generator the gas bag cover is not yet torn fully open owing to the lower pressure in the gas bag. It could be fixed that the gas bag thereby only unfolds in part and that the internal pressure of the unfolded section of the gas bag is however sufficient in order to protect an occupant adequately in the event of impact against the gas bag.

The increasing effort required to tear open the gas bag cover can be achieved in different ways. Thus in a first embodiment it is proposed that the thickness of the cover increases at least in sections starting from a predetermined point with increasing distance from the rip seam. With a particular design of this embodiment the thickness of the gas bag cover increases continuously starting from the rip seam.

In a further embodiment radially aligned incisions are provided as rip lines whose depth decreases away from the centre.

In a third embodiment starting from a central area there are incisions aligned at least approximately parallel and whose depth decreases more and more away from the central area.

In a fourth embodiment at least one reinforcement rib is provided on the gas bag cover from a predetermined point and having at least in sections increasing height as the distance from a rip seam increases. In a special configuration the reinforcement rib has a continuously increasing height.

In a further embodiment the gas bag cover has at least one reinforcement which engages in a fold of the gas bag. This reinforcement represents an additional obstacle in order to prevent a part of the gas bag from unfolding in the event of ignition of for example the first stage of the gas bag. Preferably at least a circumferential reinforcement is provided which engages in at least one circumferential fold.

Another development of the gas bag cover is characterised in that this has a section which even after opening of the gas bag cover through the unfolding gas bag covers a partial area of the housing for storing the folded gas bag.

In a further embodiment the folded gas bag is enclosed at least in part by a foil which becomes more difficult to tear the further away from the rip seam. With a foil of this kind the same effect is achieved as with the cover designed according to the invention or its action is assisted by same.

A gas bag which is folded so that after ignition of the gas generator it is drawn successively out from the housing of the airbag module through the gases discharged from the generator lies in one embodiment in a folded layer next to the gas generator or diffuser and only one gas bag layer extends over same.

BRIEF DESCRIPTION OF THE DRAWINGS

The invention will now be explained with reference to the embodiments shown in the drawings in which:

FIG. 1a shows a miniaturised view of the underneath of the gas bag cover according to FIG. 1 in a first configuration;

FIG. 1b shows a miniaturised view of the underneath of the gas bag cover according to FIG. 1 in a second configuration;

DETAILED DESCRIPTION OF THE PREFERRED EMBODIMENTS

Figure 1:
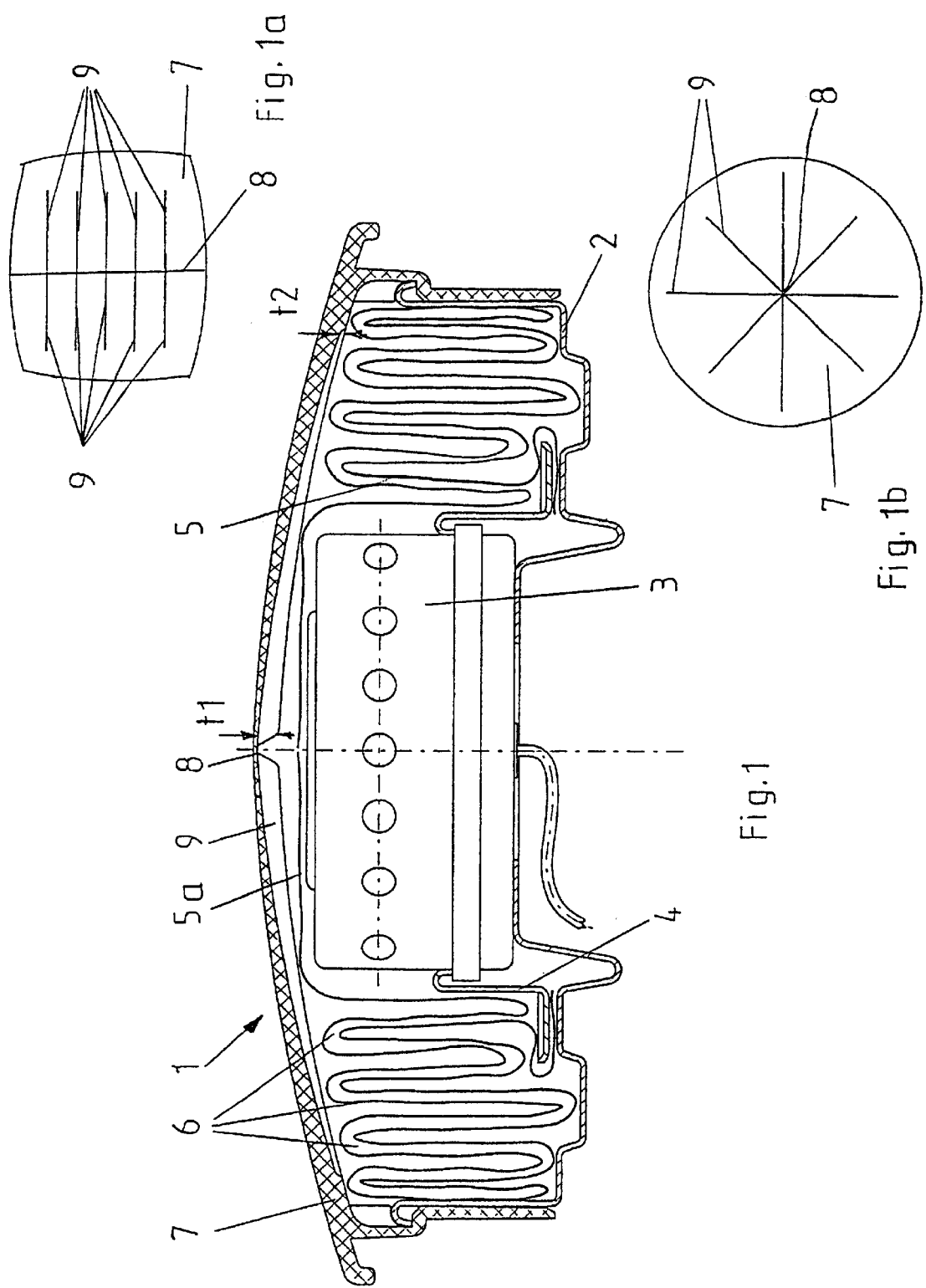
FIG. 1 shows a sectional view through an airbag module with a first embodiment of a gas bag cover.

With the airbag module 1 illustrated in FIG. 1 a multi-stage gas generator 3 is mounted in a housing 2. A gas bag 5 is fixed on the housing by a holding plate 4. The gas bag 5 is folded ring-shaped so that the folds 6 run perpendicular and extend in a ring around the gas generator 3. Only one layer 5a of the gas bag 5 thereby lies over the gas generator 3. Through this known type of folding it is reached that after ignition of the gas generator 3 the gas bag 5 is drawn out successively from the housing 2 through the gases discharged from the generator and in the first unfolding stage at first a gas bag cover 7 is ripped open starting from the middle area 8. With this type of unfolding the overall gas bag packet is thus not pushed out of the housing through the gases and then unfolded but rather the gas bag is drawn out from the housing 2 fold by fold.

The gas bag cover 7 which has a constant thickness is provided with incisions 9 whose depth decreases away from the central area 8 towards the edge from t1 to t2 so that according to a first embodiment according to FIG. 1a starting from a rip seam in the central area 8 increasingly higher forces are required for opening up the gas bag cover 7 still further.

Figure 2:
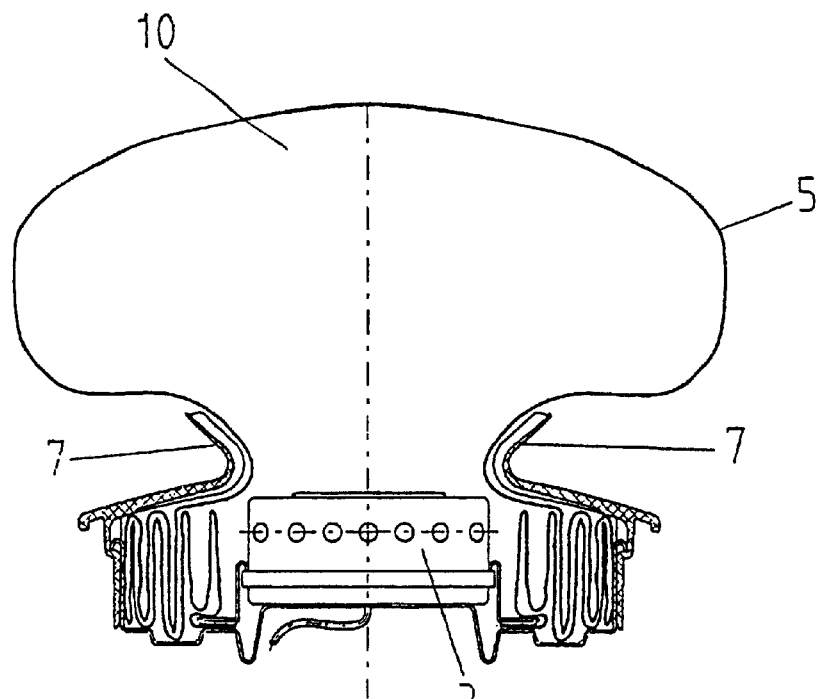
FIG. 2 shows the airbag module according to FIG. 1 with a partially unfolded gas bag after ignition of the first stage of a multi-stage gas generator.

FIG. 2 shows the airbag module in the first phase of the deployment of the gas bag 5, e.g. after ignition of a first stage of the multi-stage gas generator 3. The gas bag cover 7 has in this phase been only partially opened through the gas bag 5 which has been loaded with a partial gas amount. The gas bag 5 is only partially unfolded and includes a smaller volume 10 compared with when it is fully unfolded. The internal pressure in the gas bag 5 thereby corresponds approximately to that of the fully unfolded gas bag when loaded with the entire charge of the gas generator so that an occupant is sufficiently protected in the event of impact against the gas bag. The risk of bursting through and striking a fixed structure of the motor vehicle does not exist.

Figure 3:
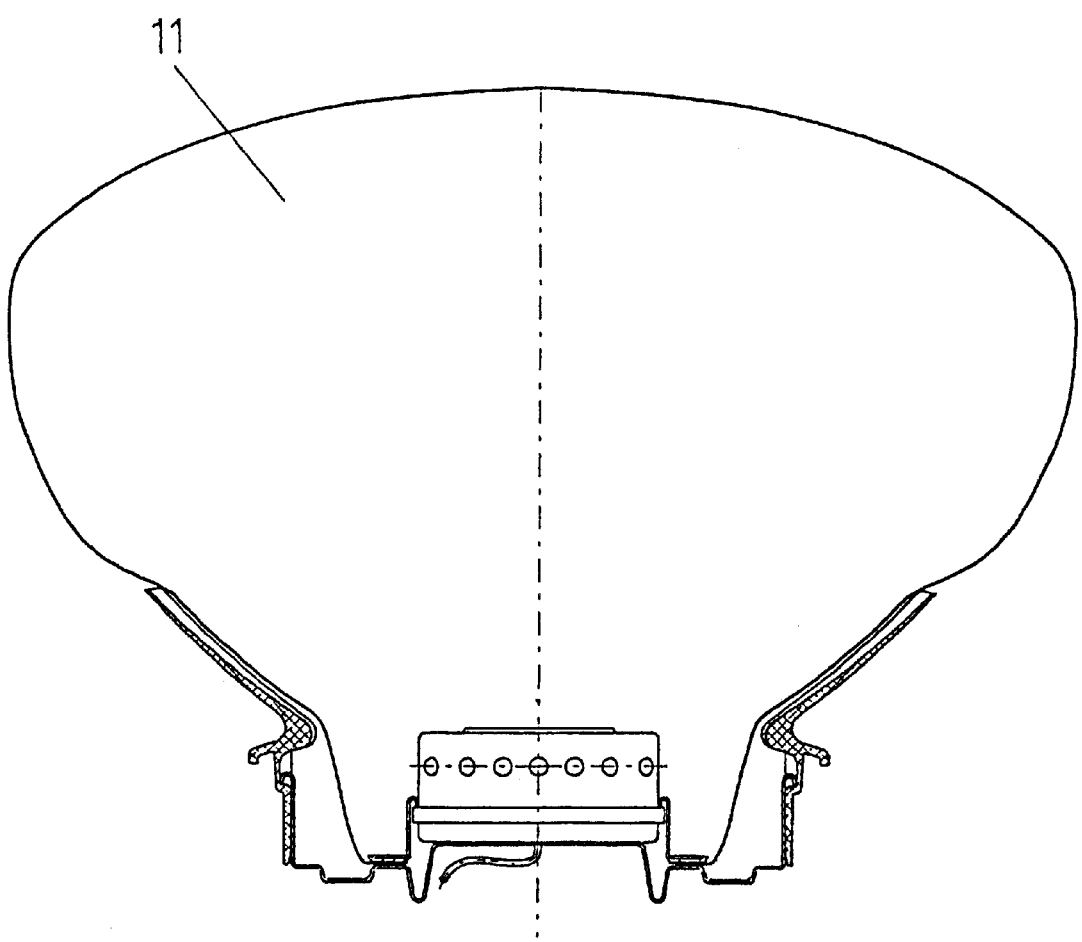
FIG. 3 shows the airbag module according to FIG. 1, with a fully unfolded gas bag after ignition of the last stage of the multi-stage gas generator.

After ignition of the last stage of the gas generator 3 the gas bag can completely tear open the gas bag cover 7 and the gas bag 5 unfolds to its full size and includes the large volume 11 shown in FIG. 3.

The same effect is achieved with the configuration according to FIG. 1b where incisions 9 are formed as radially aligned rip lines for which increasingly larger forces have to be used to open same on account of their decreasing depth starting from the central area 8.

Figure 4:
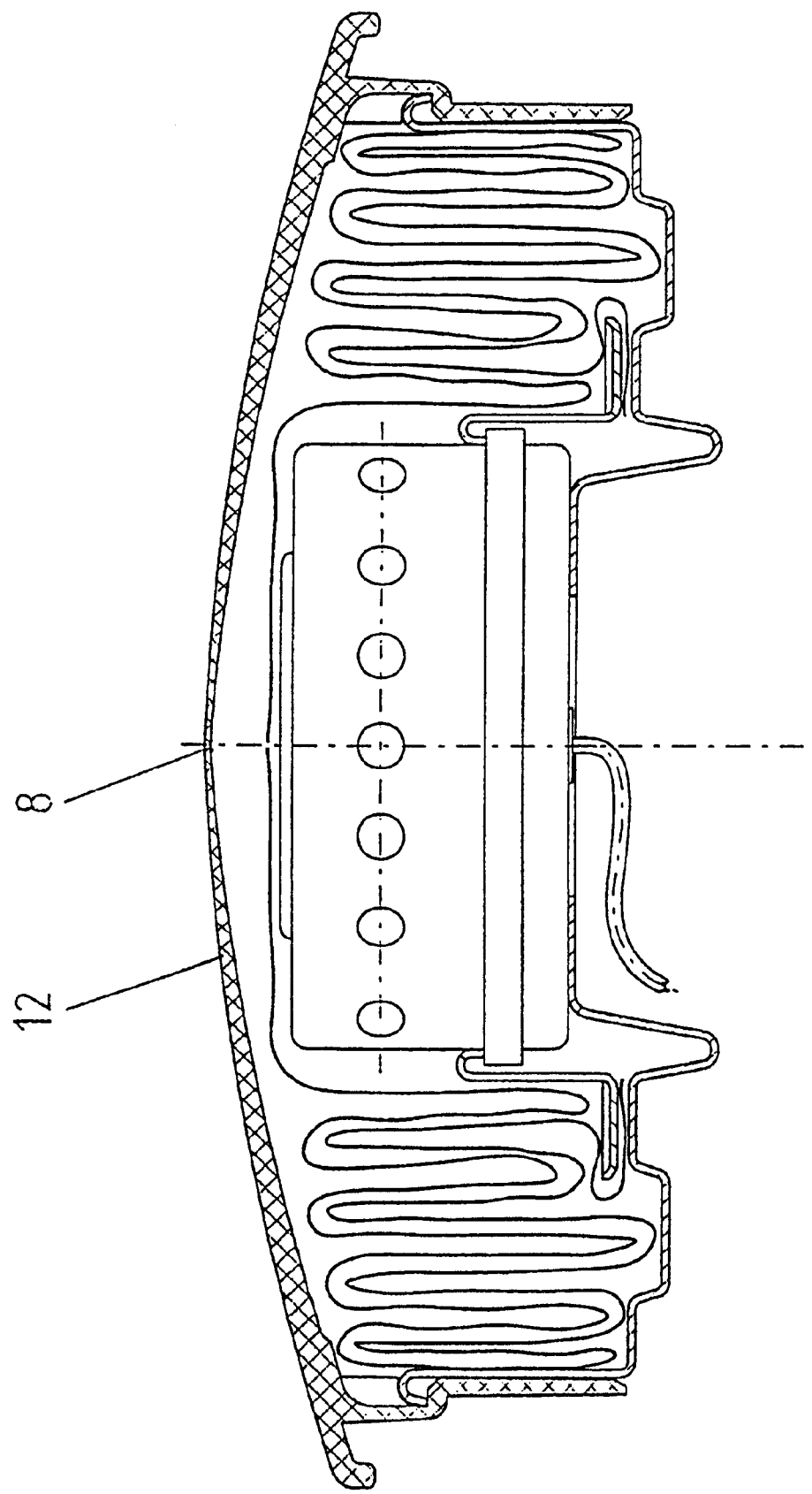
FIG. 4 shows a section through a second embodiment of an airbag module with a gas bag cover which is different from the first embodiment.

The embodiment of FIG. 4 differs from that of FIG. 1 in that a gas bag cover 12 is provided which starting from the central area 8 has an increasingly greater thickness so that the gas bag cover 12 has the lowest bending resistance in the central area 8 and an increasingly greater bending resistance towards the outside.

Figure 5:
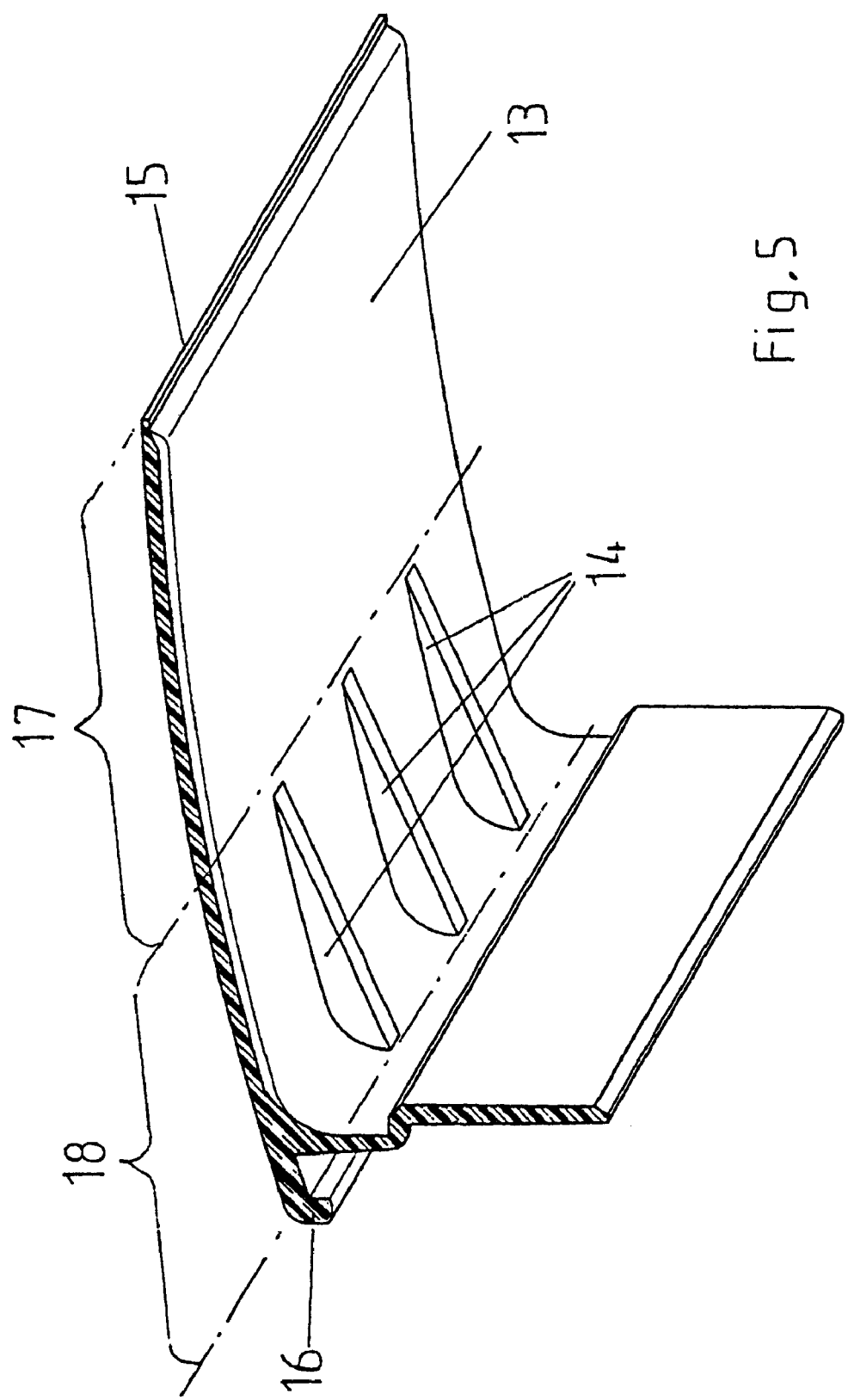
FIG. 5 shows a section through a third embodiment of the gas bag cover.

With the embodiment illustrated in FIG. 5 a gas bag cover 13 having a constant thickness is provided with reinforcement ribs 14. These extend from a predetermined distance from a central rip seam 15 towards the edge of the gas bag cover 13 and have an increasingly greater thickness towards the edge of the cover. A gas bag cover thereby has an area 17 which is easy to open and an area 18 which becomes more difficult to open towards the edge 16.

Figure 6:
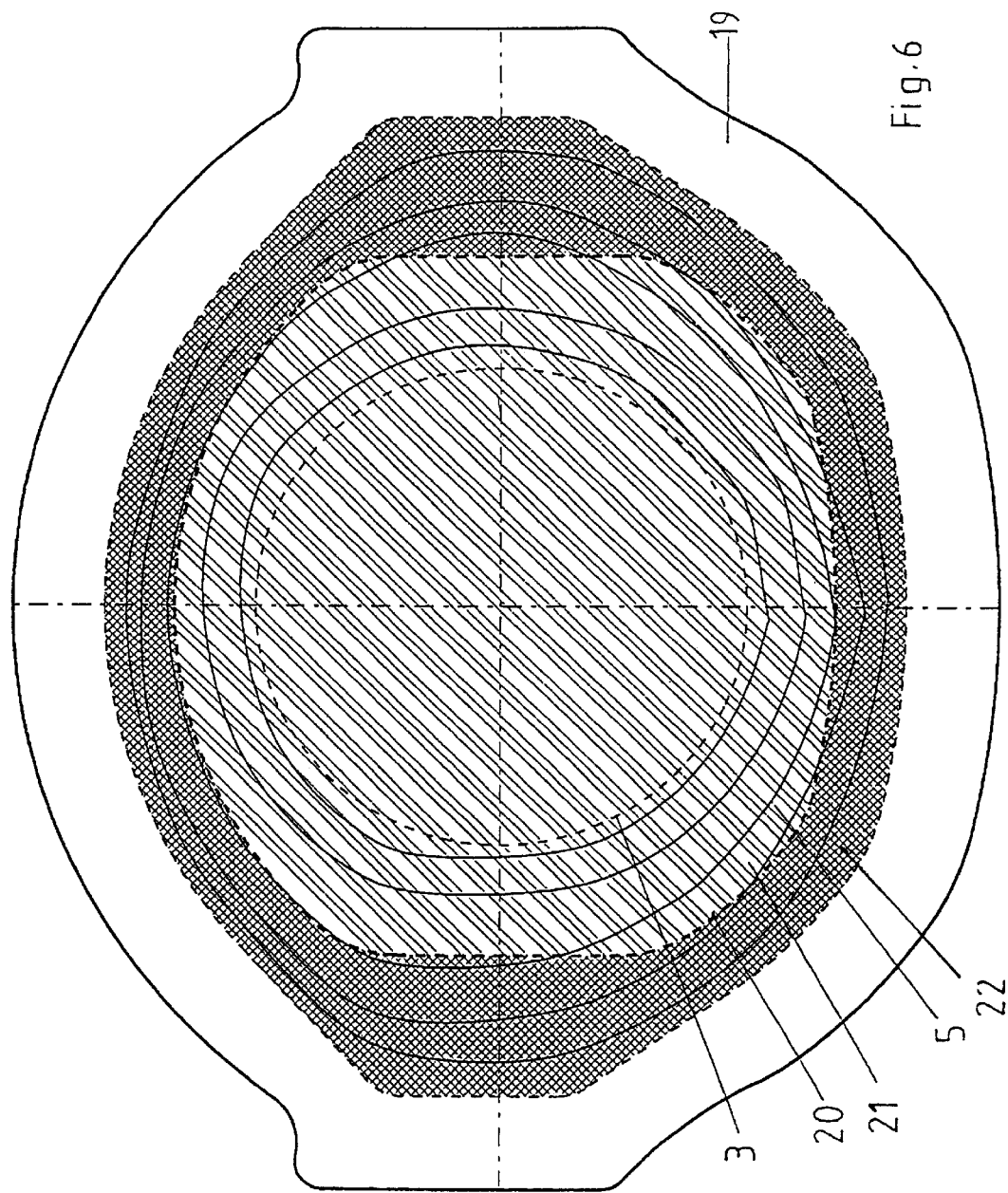
FIG. 6 shows a plan view of a fourth embodiment of the gas bag cover.

In FIG. 6 a gas bag cover 19 is shown in which a maximum opening cross-section is provided which corresponds to the surface 21 defined by the line 20 and marked by shading. The folded gas bag 5 which is mounted around the gas generator 3 extends radially out beyond the line 20. A part of the folded gas bag thereby lies under a section 22 of the gas bag cover which even after ignition of the last stage of the gas generator is not removed and is emphasised in the drawing by a cross-hatching. After ignition of the first stage of the gas generator 3 the part of the gas bag lying in the region of the surface 21 can unfold easily whilst the part of the gas bag lying underneath the section 22 remains substantially in its folded position. The unfolded gas bag in this phase has the smaller volume shown in FIG. 2 with the advantages described further up. Only after ignition of the last stage of the gas generator is also the part of the gas generator lying underneath the section 22 of the gas bag cover unfolded and the gas bag reaches the final size illustrated in FIG. 3.

Figure 7:
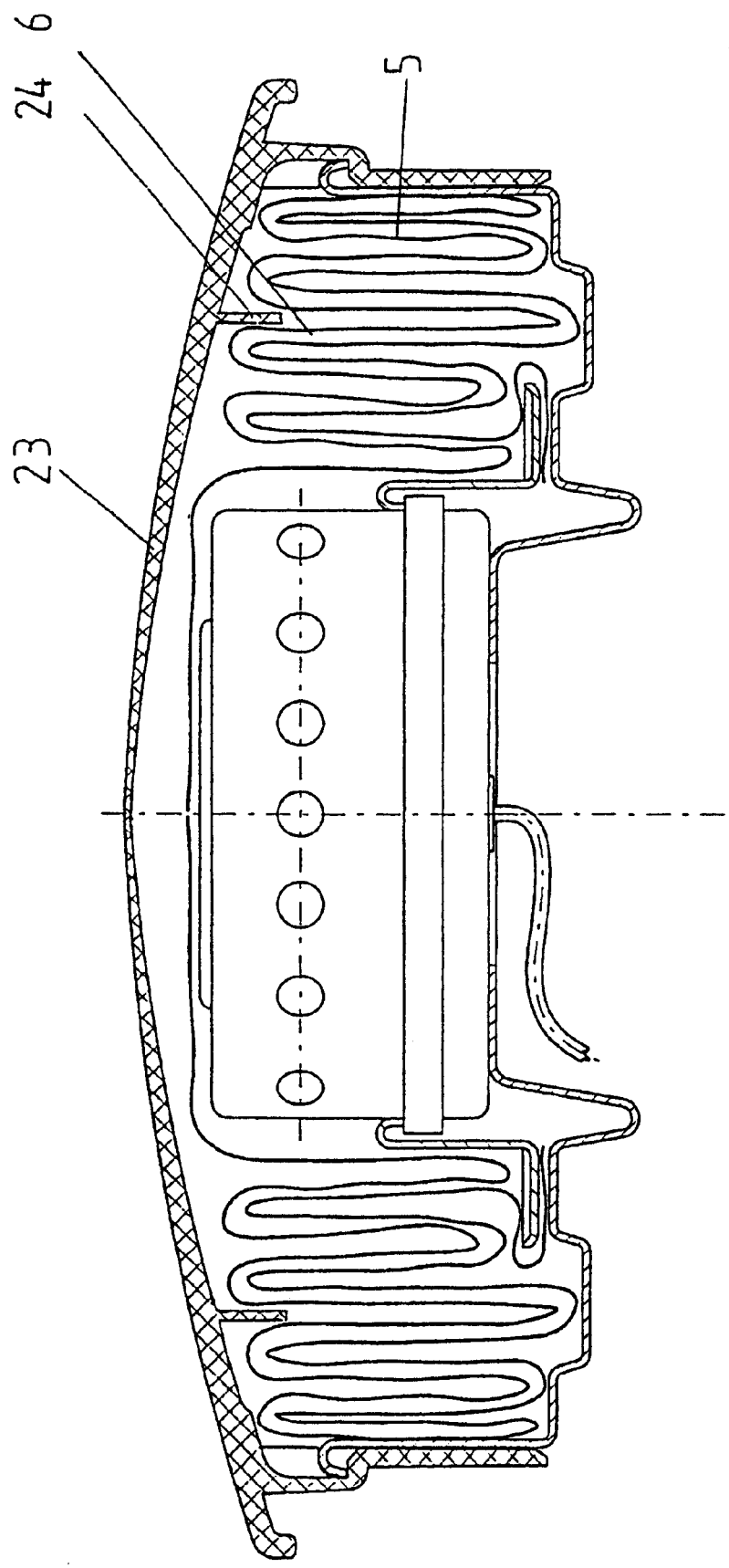
FIG. 7 shows a section through a fifth embodiment of an airbag module with a modified gas bag cover.

With the embodiment of FIG. 7 a circumferential reinforcement 24 is mounted on a gas bag cover 23 and engages in a likewise circumferential fold 6 of the gas bag. The reinforcement 24 represents an additional means for preventing the unfolding of the folds lying on the outside after ignition of the first stage of the gas generator.

Figure 8:
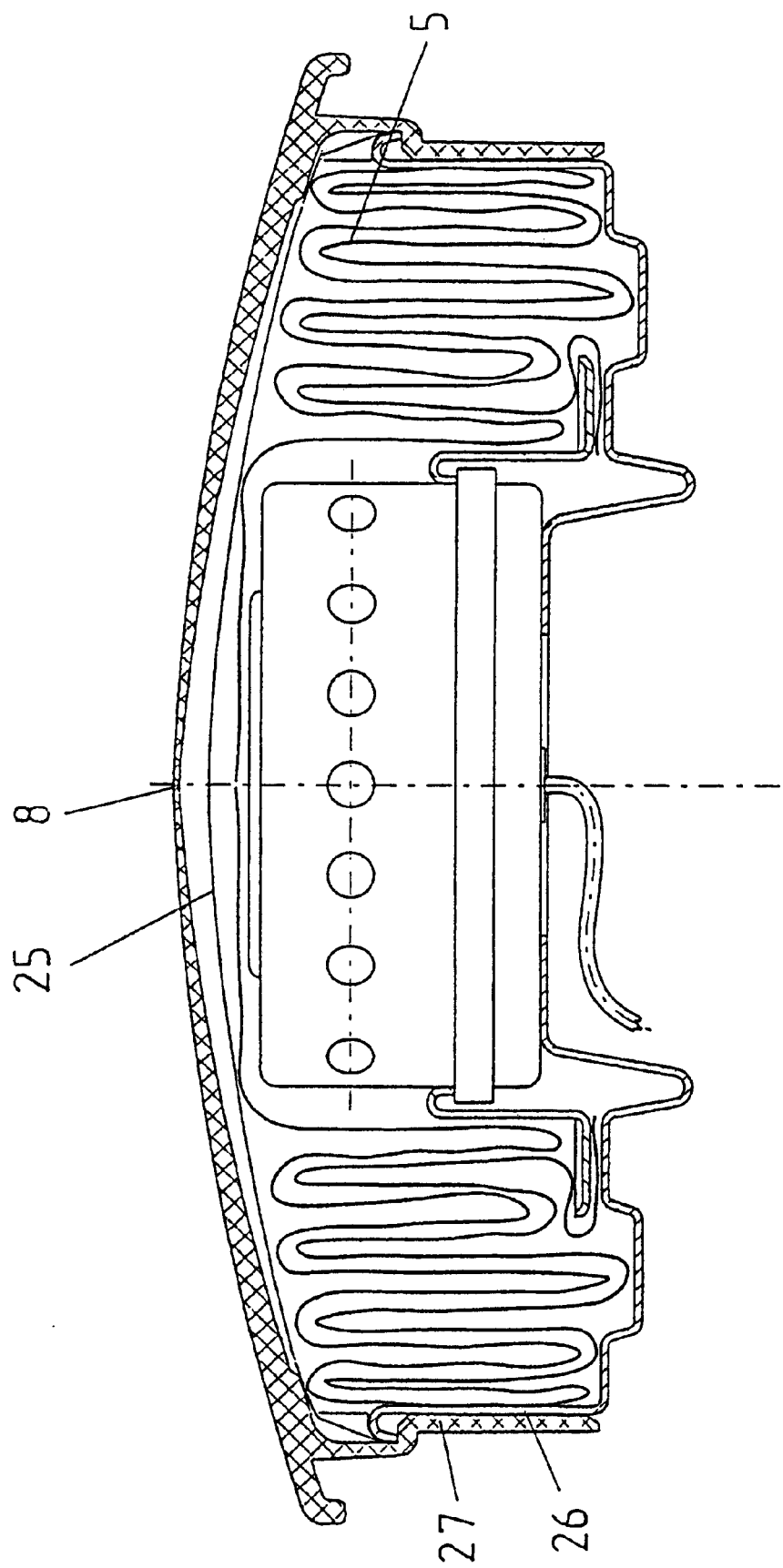
FIG. 8 shows a section through an airbag module in which the gas bag is covered by a foil.

Finally in FIG. 8 an embodiment is shown where a foil 25 is provided over the folded gas bag 5 as additional means for preventing complete unfolding of the gas bag after ignition of the first stage of the gas generator, with the foil being clamped between a side wall 26 of the housing 2 of the airbag module and a side wall 27 of the gas bag cover. The foil 25 is formed so that it becomes increasingly more difficult to tear open starting from the central area 8 of the airbag module towards the side. A similar effect is thereby achieved compared with the previous embodiments.

What is claimed is:

1. Airbag module having a gas generator, gas bag and a gas bag cover which is mounted over the gas bag and is to be opened by the gas bag as the gas bag unfolds, wherein after opening of the gas bag cover from a predetermined time point onwards increasingly greater forces are necessary for the gas bag to be deployed, wherein the gas generator has multiple stages, the gas bag in an inoperative state lies in a folded condition next to the gas generator and only one gas bag layer extends over the generator so that after ignition of the gas generator the gas bag is drawn successively out from a housing of the airbag module by the gases discharged from the generator, and wherein the gas bag cover is formed so that after opening the gas bag cover increasingly greater forces are required to unfold the gas bag from a predetermined time point onwards and so that an outer part of the gas bag only unfolds in the event of said greater forces.

2. Airbag module according to claim 1 wherein the gas bag cover includes a portion having increased resistance to tearing open in response to inflation of the gas bag.

3. Airbag module according to claim 1 wherein the thickness of the gas bag cover increases with increasing distance from a rip seam.

4. Airbag module according to claim 1 wherein the thickness of the gas bag cover increases continuously starting from a rip seam.

5. Airbag module according to claim 1 wherein the gas bag cover includes radially aligned incisions as rip lines which have decreasing depth starting from the center of the cover.

6. Airbag module according to claim 1 wherein starting from a central area of the cover incisions are provided which are aligned at least approximately parallel and which have an increasingly smaller depth starting from the central area.

7. Airbag module according to claim 1 wherein the gas bag cover is provided with at least one reinforcement rib which has an increasing height with increasing distance from a rip seam.

8. Airbag module according to claim 7 characterised in that the reinforcement rib (14) has a continuously increasing height.

9. Airbag module according to claim 1 wherein the gas bag cover has at least one reinforcement which engages in a fold of the gas bag.

10. Airbag module according to claim 9 characterised in that at least one circumferential reinforcement (24) is provided which engages in at least one circumferential fold (6).

11. Airbag module according to claim 1 wherein the gas bag cover has a section which is configured so that after opening of the gas bag cover through the unfolding gas bag the section covers a partial area of the housing of the airbag module.

12. Airbag module according to claim 1 wherein the folded gas bag is enclosed at least in part by a foil which becomes more difficult to tear with increasing distance from a rip seam.

13. An airbag module comprising:

an airbag which is folded and which has folds;

a multi-stage gas generator;

an airbag cover mounted over the airbag and configured to rip open when the airbag inflates as a result of gas discharged into the airbag by the gas generator;

wherein the airbag cover includes an inner portion and an outer portion, wherein the outer portion is configured to be more resistant to the forces associated with the inflating airbag, and wherein the outer portion of the airbag cover includes a reinforcing member extending downward toward the folded airbag and positioned within the folded airbag to prevent unfolding of the folds in the airbag which are positioned outward of the reinforcing member.

* * * * *